Figure 1:
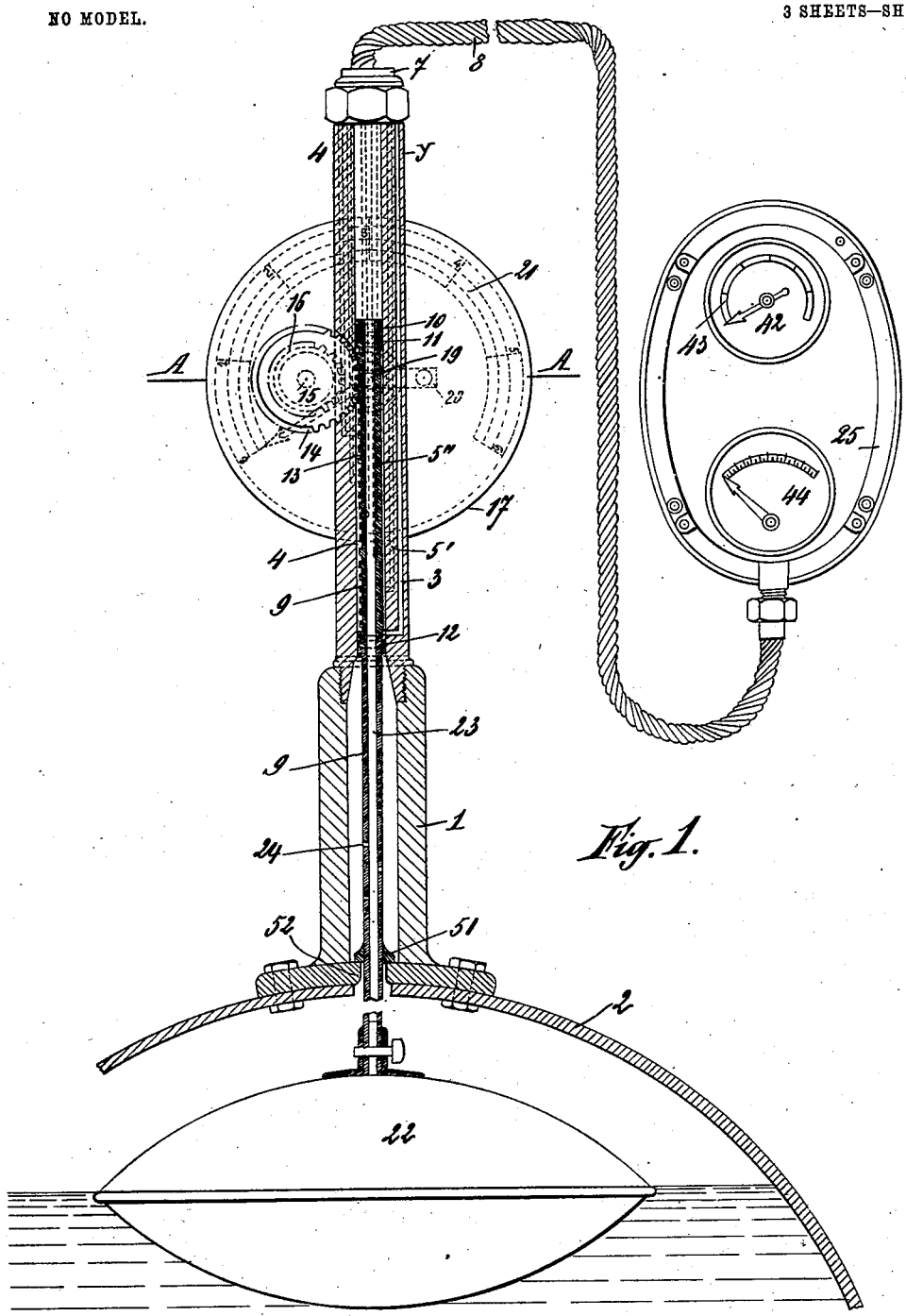

No. 723,621. PATENTED MAR. 24, 1903.
P. A. RENAUX.
APPARATUS FOR INDICATING THE WATER LEVEL IN BOILERS.
APPLICATION FILED MAR. 27, 1902.
NO MODEL. 3 SHEETS—SHEET 1.

No. 723,621. PATENTED MAR. 24, 1903.
P. A. RENAUX.
APPARATUS FOR INDICATING THE WATER LEVEL IN BOILERS.
APPLICATION FILED MAR. 27, 1902.
NO MODEL. 3 SHEETS—SHEET 2.
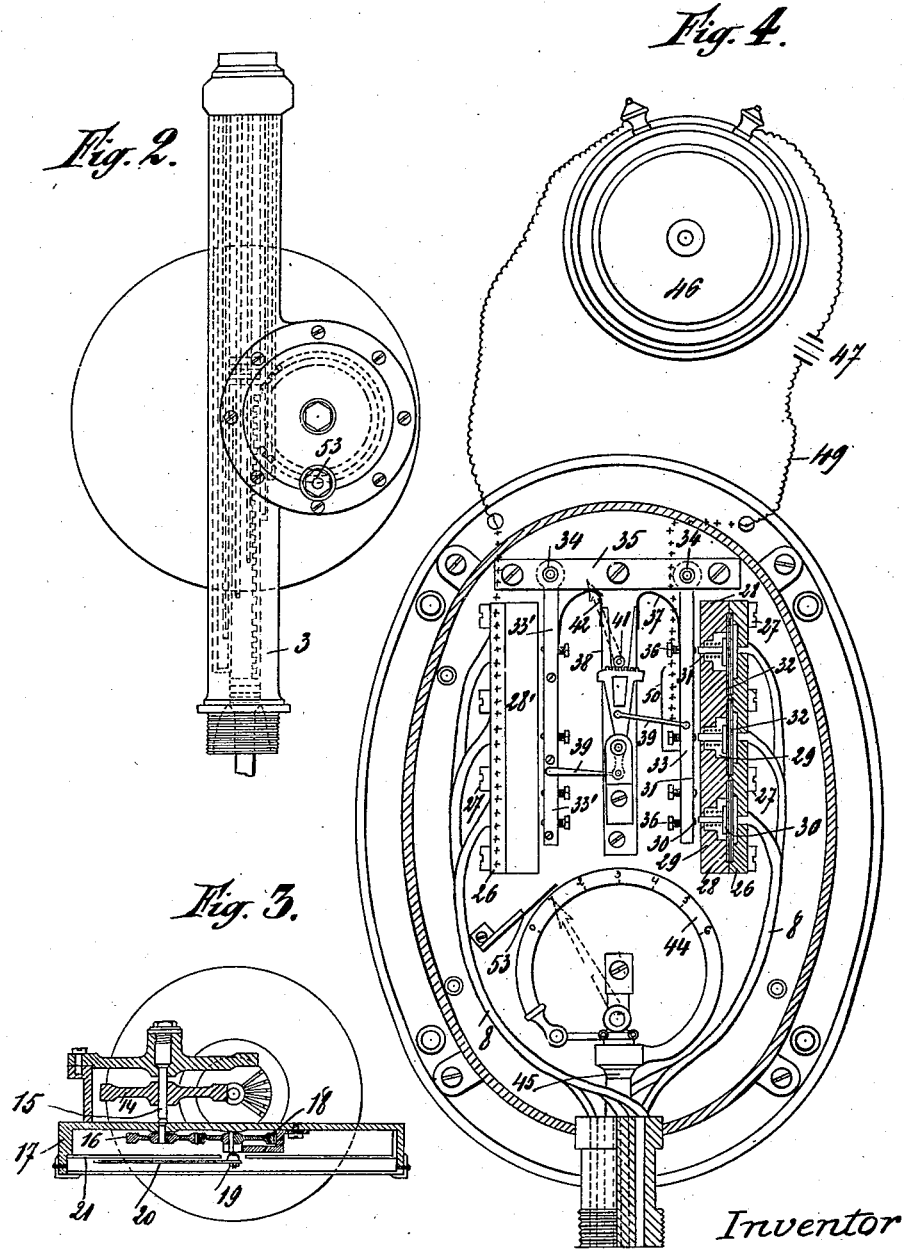

UNITED STATES PATENT OFFICE.

PROSPER ALEXANDRE RENAUX, OF PARIS, FRANCE.

APPARATUS FOR INDICATING THE WATER-LEVEL IN BOILERS.

SPECIFICATION forming part of Letters Patent No. 723,621, dated March 24, 1903.

Application filed March 27, 1902. Serial No. 100,211. (No model.)

*To all whom it may concern:*

Be it known that I, PROSPER ALEXANDRE RENAUX, locksmith mechanic, a citizen of the French Republic, residing at Paris, France, have invented certain new and useful Improvements in Apparatus for Indicating the Water-Level in Boilers, of which the following is a specification.

My invention relates to improvements in indicators for ascertaining the water-level in boilers at a distance wherein a transmitter fitted with a piston operated by a float distributes, successively, steam from the boiler, according to the water-level, into a series of tubes joined to a receiver, and such steam then acts on a series of pistons which successively actuate levers for operating an indicator hand or pointer.

This invention has for its object to render the piston of the transmitter in this class of apparatus independent of the action of the pressure which acts on the piston, or, in other words, to provide a perfectly-balanced distributing-piston for the transmitter, and thereby render the latter sensitive only to the variations of water-level in the boiler and prevent the indications of the receiver being inaccurate by reason of the action of the pressure.

A further object is to improve the construction of the receiver in such a manner as to insure the proper function of the apparatus under all circumstances.

My invention consists, essentially, in employing in the transmitter a distributing-cylinder in which moves a rod forming a piston-valve. Said rod is perforated throughout its length, so as to form a central conduit communicating with the interior of the boiler by means of a number of orifices in the distributing-cylinder for the passage of steam, which latter is thereby permitted to act on the surface of the piston-valve, while at the same time forming a conduit capable of being connected to a gage combined with the receiver.

It also consists in the disposition of the receiver-pistons upon two symmetric series situated at each side of the indicator-pointer for operating the latter successively, according to the number of conduits through which the steam obtains access to the transmitter, and in the combination with these receiver-pistons of flexible plates of caoutchouc, for example, for insuring a tight joint for this part of the receiver.

In the accompanying drawings I have shown by way of example a convenient construction according to this invention, in which—

Figure 5:
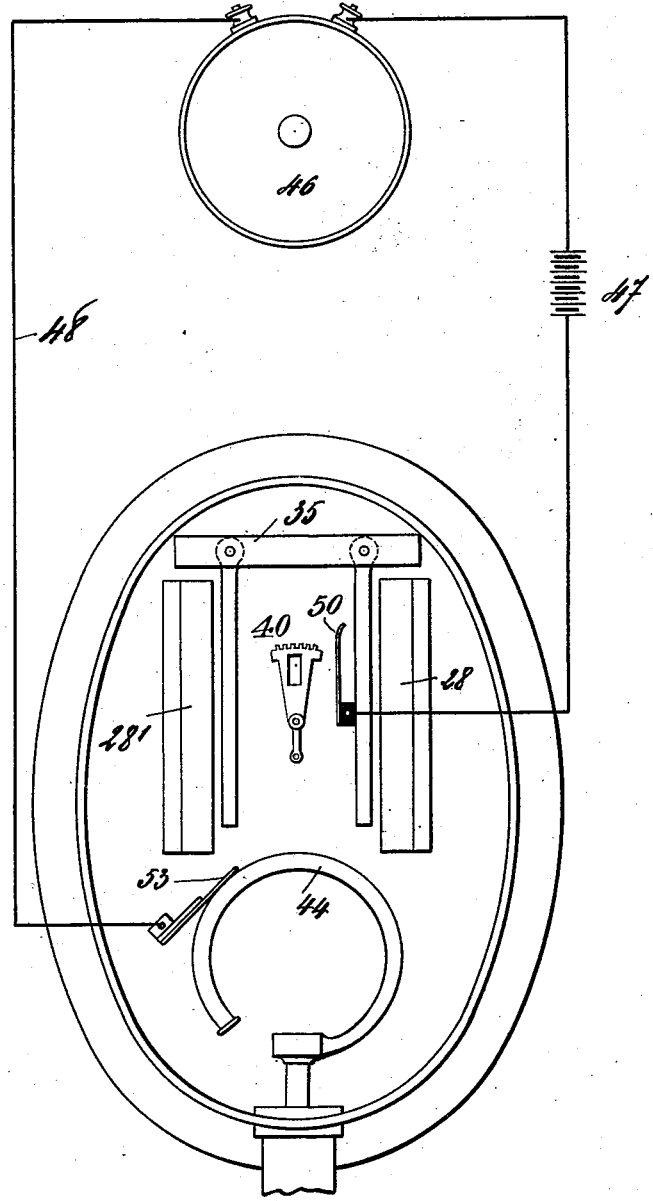

Figure 1 is an elevation of the complete apparatus, the transmitter alone being shown in section. Fig. 2 is a rear elevation of the transmitter. Fig. 3 is a horizontal section, taken on the line A A, Fig. 1, of the transmitter. Fig. 4 is a separate view, drawn to a larger scale and partly shown in section, of the receiver, the dial being removed. Fig. 5 is a view showing more particularly the electric circuits.

The transmitter comprises a column 1, fixed to the boiler-plates 2. Upon the said column is screwed or otherwise fixed a cylinder 3, in the central conduit of which open tubes 5 5′ 5″, which latter have no communication with one another and separately open at the upper end of the cylinder 3, where they can communicate by means of a nut 6, furnished with a head 7, the latter being fitted with as many tubes 8 as there are passages in the walls of the cylinder 3.

The tubes 8 extend, as will hereinafter be described, to the receiver placed at a distance. The cylinder 3 is fitted with a rod 9, provided at its upper part with a piston 10, furnished with packing-rings 11. The said rod is formed at the part 12 with a second piston, so that a certain space is formed between the rod and the internal surface 4 of the cylinder 3, which is limited by such pistons 10 and 12. The rod is formed with rack-teeth 13 between the two pistons 10 and 12, which gear with a toothed wheel 14, mounted on the same shaft 15 with a second toothed wheel 16, placed in a casing 17 and driving a toothed wheel 18, Fig. 3, mounted upon a pivot 19, which carries a pointer 20, adapted to travel over a dial 21, appropriately graduated.

The rod 9 projects into the column 1 and is connected by its lower end to a float 22, kept at the surface of the boiler-water. The rod 9 is perforated for its entire length, so as to form a central conduit 23, into which the steam from the top of the boiler and column 1 enters through orifices 24.

The tubes 8, each of which is individually connected with one of the separate passages 5 5' 5'' of the transmitter, lead, as before stated, to a receiver 25, placed at a distance.

In the receiver the tubes 8 are divided into two series, each of which latter is connected with a plate 26, fixed by means of screws 27 to a supporting-block 28 28', formed with a number of cavities 29, furnished with a small piston 30, controlled by the action of a spring 31, adapted to press the piston against a flexible plate 32, of caoutchouc, for example, for insuring a tight joint in front of the pistons 30. Each cavity 29 differs in size, so as to permit a definite stroke to each piston 30— for example, a stroke of one millimeter for the first, a stroke of two millimeters for the second, a stroke of three millimeters for the third, a stroke of four millimeters for the fourth, (the first in the second support 28',) &c. Adjacent to each of such series of pistons 30 is mounted an oscillatory lever 33 33', respectively fulcrumed at 34 upon a cross-bar 35 and pressing, by means of set-screws 36, upon each piston 30. These two levers 33 33' are kept in contact with the pistons 30 (when the apparatus is inoperative) by springs 37, fixed to a support 38 and operating, by means of links 39, a toothed sector 40, which latter operates a toothed pinion 41, mounted upon the spindle of a hand or pointer 42, adapted to travel over a dial 43, Fig. 1, with divisions similar to those of the dial 21. The receiver is further provided with a gage 44, the tube 45 of which is connected by one of the tubes 8 with the chamber formed in the cylinder 3 above the piston 10. The said receiver may also be furnished with a bell or any other appropriate electric alarm device 46, the circuit of which includes a battery 47 and the conductor 48, leading to the body of the apparatus by aid of a spring 53, resting against the steam-gage tube 44 on the one part and on the other part the conductor 49 and spring 50, against which rests the sector 40 when in its position of rest.

The apparatus operates as follows: The float 22, by reason of the fluctuation of the water-level in the boiler 2, causes the rod 9 to move vertically in the cylinder 3. In the position shown in Fig. 1 the float is shown in its lowermost position and the boiler idle. As shown in the drawing, the rod 9 reposes in such case, by means of a stop 51, upon a flange or shoulder 52 of the column and cannot farther descend, so that the piston 12 is prevented from escaping from the cylinder 4. In this position the pistons 10 and 12 occupy in the cylinder 3 such a position as to cause all the passages 5 5' 5'' to open between the said pistons 10 and 12, the pointers 20 and 42 being at zero on their respective dials 21 and 43. The sector 40 rests against the spring 50; but the spring 53 interrupts the circuit of the alarm 46 of the gage 44, the tube of which latter is reduced to its minimum diameter by reason of the absence of pressure in the boiler. When the boiler is under pressure, the tube 44 of the steam-gage dilates and comes into contact with the spring 53 and closes the circuit, whereupon at low water the alarm is sounded. If the level of the water rises, the float 22 ascends, lifts the rod 9, and causes the piston 12 of this latter to uncover the passage 5 opening into the cylinder 3. If then care has been taken to fill the tubes 8 with distilled water, for example, the steam in exerting pressure upon the water contained in the tube corresponding to the passage 5 causes such water to act in the receiver upon the plate 32 of the piston 30, which then acts against the extremity of the lever 33. This lever when thus moved for the quantity corresponding to the displacement of the first piston 30 displaces, by means of the arm 39, the sector 40 in such a manner as to cause the pointer 42 to indicate on the dial 43 the position occupied by the float according to the water-level in the boiler 2. At the same movement also the sector 40 separates from the spring 50 and interrupts the bell-circuit. Simultaneously, owing to its displacement, the rod 9 operates by its rack 13 the toothed wheel 14, which then, through the intervention of the gear-wheels 16 and 18, causes the pointer 20 to indicate on the dial 21 the water-level in the boiler. As the level rises the rod 9 continues to move and causes, through the intervention of the rack 13, the corresponding displacement of the pointer 20. When the water-level has risen by a sufficient quantity, the piston 12 uncovers the orifice of the second tube 5' in the cylinder 3. The steam entering in turn in this tube 5' transmits through the corresponding tube 8 an impulse to the distilled water contained in the latter, whereupon the said water acts in the receiver on the flexible plate 32 of the second piston 30, situated nearer the pivot 34 of the lever 33 in comparison with the first-operated piston. The stroke of the second piston being greater than that of the first piston previously operated causes the lever 33 to swing again for a certain distance, and thus produces renewed displacement of the pointer 42, which thus accurately indicates the water-level in the boiler. The operation continues in this manner as long as the level rises, the steam gaining successively access to each of the tubes of the cylinder 3, and thereby successively operates the pistons 30 in the receiver. After the three pistons of the lever 33 have effected the displacement of the sector 40 the other lever 33' enters into play in its turn and continues to produce the displacement rendered possible, as can be easily ascertained, by the different and proportional strokes of the pistons 30. When the level sinks again, the float descends and lowers the rod 9, so that the piston successively interrupts the ingress of steam into the tubes 5'' 5' 5 of the cylinder 3.

The steam contained in these tubes thereupon escapes into the space of the cylinder between the two pistons 10 and 12, from which it escapes to the exterior through an orifice 53', Fig. 2, provided in the casing of the apparatus. The columns of distilled water contained in the tube 8 being no longer subjected to the pressure of the steam reoccupy their normal position, while the pistons 30 are also successively returned to their position and allow the levers 33 33', under pressure of the springs 37 with the intervention of the levers 39 and sector 40, to turn back the pointer 42 over the graduations of the dial 43. Thus, as shown in Fig. 4, when the sector returns to its original position by reason of low water in the boiler while the latter is under steam-pressure it strikes against the spring 50, and thereby closes again the bell-circuit 46, (closed also at the spring 53,) for the reason that the gage is under pressure, thus announcing the want for water in the boiler.

It will be noticed from the aforesaid construction that the central conduit 23 of the rod 9 permits the steam to have constant access to the upper part of the cylinder 3 above the piston 10. In this manner the steam-pressure on the lower face of the piston 12 is balanced and the apparatus is completely equilibrated, so that the indications will be correct, which, however, is not the case with the construction heretofore adopted for this class of apparatus. The same is to be remarked with reference to the receiver, in which the adoption of the plates 32, of caoutchouc, for example, which form a tight joint for the pistons 30, prevents the losses which occur at this part in other apparatus. Moreover, the arrangement of these pistons in two symmetrical series in cavities or recesses of different sizes and disposed for successive action prevents irregular action of the apparatus and renders the same more sensitive.

What I claim is—

1. In an apparatus for ascertaining the water-level in boilers at a distance, the combination with a steam-distributing cylinder, and a series of tubes opening in the said cylinder, of a rod provided with two pistons and connected to a float, said rod being perforated for its entire length so as to form a central conduit into which the steam of the boiler enters through suitable orifices so as to balance the steam-distributing pistons of the transmitter.

2. In an apparatus for ascertaining the water-level in boilers at a distance, in combination a steam-distributing cylinder, a series of tubes opening in the said cylinder, a rod fitted with two pistons moving in the said cylinder, a float connected to said rod, a central conduit extending through the said rod, a number of orifices opening in the said central conduit and in the steam-chamber of the boiler so as to allow the steam of the boiler to pass through the rod and to act on the piston at the top of the rod, a pointer acted upon by the said rod, a number of tubes leading to a receiver, two symmetric series of pistons in the said receiver at each side of an indicator-pointer, each of these receiver-pistons acting in a cavity differing in size so as to allow a definite stroke for each piston, flexible plates in front of each piston and levers for operating the indicator-pointer in the receiver, substantially as described.

3. In an apparatus for ascertaining the water-level in boilers at a distance, in combination a transmitter fitted with a balanced distributing-piston rod substantially as described, a receiver connected therewith and provided with two symmetric series of pistons effecting each a definite stroke substantially as described, a gage and an electric alarm device for announcing the want of water in the boiler when the latter is under steam-pressure, substantially as described and for the purpose set forth.

In witness whereof I have hereunto set my hand in presence of two witnesses.

PROSPER ALEXANDRE RENAUX.

Witnesses:
EUGÈNE COMBESCURE,
GEORGES CHAILLETE.